(12) United States Patent
Vulkan et al.

(10) Patent No.: US 10,183,574 B2
(45) Date of Patent: Jan. 22, 2019

(54) DRAINING DEVICE

(71) Applicant: RAVAL A.C.S. LTD., Beer-Sheva (IL)

(72) Inventors: Omer Vulkan, D.N. Hanegev (IL); Vladimir Olshanetsky, Beer Sheva (IL); Denis Kleyman, Mabu'im (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 0 days.

(21) Appl. No.: 15/035,971

(22) PCT Filed: Dec. 8, 2014

(86) PCT No.: PCT/IL2014/051070
§ 371 (c)(1),
(2) Date: May 11, 2016

(87) PCT Pub. No.: WO2015/087320
PCT Pub. Date: Jun. 18, 2015

(65) Prior Publication Data
US 2016/0297296 A1    Oct. 13, 2016

Related U.S. Application Data

(60) Provisional application No. 62/056,682, filed on Sep. 29, 2014, provisional application No. 61/913,456, filed on Dec. 9, 2013.

(51) Int. Cl.
*B60K 15/035* (2006.01)
*F16K 15/02* (2006.01)
(Continued)

(52) U.S. Cl.
CPC .. *B60K 15/03504* (2013.01); *B60K 15/03519* (2013.01); *F16K 15/023* (2013.01);
(Continued)

(58) Field of Classification Search
CPC ........ F16K 15/023; F16K 24/02; F16K 24/04; Y10T 137/7904; Y10T 137/7908;
(Continued)

(56) References Cited

U.S. PATENT DOCUMENTS 2,274,276 A * 2/1942 Rappl ................... F16K 15/023
137/119.09
4,676,281 A 6/1987 Nord
(Continued)

FOREIGN PATENT DOCUMENTS

EP         1325829        7/2003
GB         851504 A  *  10/1960  ........... F16K 15/023
(Continued)

OTHER PUBLICATIONS

International Search Report and Written Opinion from International Application PCT/IL2015/050942 dated Jan. 5, 2016.

*Primary Examiner* — Kevin Murphy
*Assistant Examiner* — Kelsey Cary
(74) *Attorney, Agent, or Firm* — Dorsey & Whitney LLP

(57) ABSTRACT

A draining device for draining fuel from a fuel vapor system into a fuel tank is provided, the draining device comprising a port configured to be coupled to a fuel vapor accessory and a sealing member displaceable between a closed position in which the port is closed by the sealing member and an open position in which fuel from the fuel vapor accessory can be drained into the tank, wherein the sealing member is displaced into the open position when pressure in the tank is substantially equal to the atmospheric pressure and the fuel level in the tank is below the fuel level in the fuel vapor accessory.

25 Claims, 5 Drawing Sheets

(51) Int. Cl.
*F16K 24/02* (2006.01)
*B60K 15/03* (2006.01)

(52) U.S. Cl.
CPC .............. *B60K 15/03006* (2013.01); *B60K 2015/03509* (2013.01); *B60K 2015/03514* (2013.01); *F16K 24/02* (2013.01); *Y10T 137/7908* (2015.04)

(58) Field of Classification Search
CPC ........ Y10T 137/7909; B60K 15/03504; B60K 15/03519
USPC ........... 285/238–239; 137/197, 123; 251/331
See application file for complete search history.

(56) References Cited

U.S. PATENT DOCUMENTS

| | | | |
|---|---|---|---|
| 4,852,761 A | 8/1989 | Turner et al. | |
| 4,907,616 A * | 3/1990 | Bergsma | F16K 15/023 137/38 |
| 5,704,383 A | 1/1998 | Kammeraad et al. | |
| 6,520,200 B1 * | 2/2003 | Lawrukovich | B60K 15/03504 137/202 |
| 6,655,403 B2 * | 12/2003 | Mills | B60K 15/03519 137/2 |
| 6,681,796 B2 * | 1/2004 | King, Jr. | F16L 41/065 137/107 |
| 8,910,652 B2 * | 12/2014 | Nemeth | B60K 15/03519 137/202 |
| 2002/0121300 A1 | 9/2002 | Ehrman et al. | |
| 2008/0121834 A1 * | 5/2008 | Kern | F16H 7/0836 251/331 |
| 2009/0014090 A1 * | 1/2009 | Roscher | B60K 15/03519 141/198 |
| 2015/0118076 A1 * | 4/2015 | Grassbaugh | F16K 15/023 417/292 |
| 2015/0151631 A1 | 6/2015 | Vulkan et al. | |
| 2016/0297296 A1 | 10/2016 | Vulkan et al. | |

FOREIGN PATENT DOCUMENTS

| | | |
|---|---|---|
| WO | 2012/104850 | 8/2012 |
| WO | 2013/144960 | 10/2013 |

* cited by examiner

DRAINING DEVICE

TECHNOLOGICAL FIELD

The presently disclosed subject matter relates to draining device in general and in particular to draining valves for draining fuel from fuel vapor systems in fuel tanks.

BACKGROUND

Fuel vapor systems are installed in fuel tank and are configured to treat fuel vapor emitted from fuel tanks. The fuel vapor systems typically include a fuel treating device such as a canister configured to treat the vapor. The fuel vapor systems can further include a fuel trap configured to separate fuel droplets from the fuel vapor and to drain the droplet back to the fuel tank.

Typically, the fuel vapor systems include parts, such as fuel vapor accessories or tube segments which tend to accumulate fuel therein. Accumulation of fuel inside these parts, however, may cause a malfunction of the fuel vapor system, as the fuel path towards the fuel treating device is blocked and thus fuel vapor does not reach the fuel treating device.

Accordingly, it is necessary to provide the fuel vapor system with a draining device to, particularly to portions of the fuel vapor system which tend to accumulate fuel therein.

GENERAL DESCRIPTION

According to one aspect of the presently disclosed subject matter there is provided a draining device for draining fuel from a fuel vapor system into a fuel tank, the draining device comprising a port configured to be coupled to a fuel vapor accessory and a sealing member displaceable between a closed position in which the port is closed by the sealing member and an open position in which fuel from the fuel vapor accessory can be drained into the tank, wherein the sealing member is displaced into the open position when pressure in the tank is substantially equal to the atmospheric pressure and the fuel level in the tank is below the fuel level in the fuel vapor accessory.

The draining device can include a seal holding body having a port connectable to a fuel vapor accessory, and a cover being configured with one or more apertures being in fluid communication with the inside of a fuel tank.

The seal holding body can include a bottom portion having a diameter larger than the diameter of the port, and being configured to engage portions of the sealing member.

The sealing member can be a sealing disk, made from a sealing material and can have a diameter larger than that of the port. The sealing member can define an inlet face for engaging the port and an outlet face directed towards ambient of the valve, for example the volume of a fuel tank. Portions of the periphery of the inlet face of the sealing member can be configured to engage the bottom portion of the seal holding member.

The cover can be configured to retain the sealing member in place when the draining valve is in the open position thereof. According to an example, the cover can be a cage coupled to the bottom portion of the seal holding body.

The apertures in the cover can be formed about the periphery thereof such that when the sealing member is urged onto the inner surface of the cover, the apertures remain uncovered thereby allowing fuel to pass therethrough.

The seal holding body can have a side wall defined about the circumference thereof and being larger than the thickness of the sealing member, and having apertures defined thereon, such that when the sealing member engages the inner surface of the cover, fuel can pass through the apertures.

According to another aspect of the presently disclosed subject matter there is provided a fuel vapor accessory having a draining valve mounted thereon for draining fuel therefrom into a fuel tank, the draining device comprising a port configured to be coupled to a fuel vapor accessory and a sealing member displaceable between a closed position in which the port is closed by the sealing member and an open position in which fuel from the fuel vapor accessory can be drained into the tank, wherein the sealing member is displaced into the open position when pressure in the tank is substantially equal to the atmospheric press The draining device can be configured such that when the pressure inside the fuel tank is higher than the pressure outside the tank the sealing member maintains its engagement with the port.

The draining device can be configured such that when the sealing member disengages the port when there are no sufficient forces to overcome the gravitational forces of the liquids inside the fuel vapor accessory.

The draining device can be mounted on the fuel vapor accessory upwards or diagonally upwards such that gravitational forces of the sealing member facilitate in maintaining the engagement thereof with the port. The draining device can be configured for symphonic drainage of liquids inside the fuel vapor accessory.

The draining device can be disposed at a high point inside the tank, such that only when the fuel level in the tank is near the maximum capacity thereof, the draining device will not open.

It should be noted that when drainage of liquid in the fuel vapor system is precluded, fuel inside the fuel vapor system may prevent refueling of the tank. Thus, the height of the draining device in the tank can be determined in accordance with the desirable maximum refueling level of the tank.

According to a further aspect of the presently disclosed subject matter there is provided a fuel tank having a fuel vapor system with a draining valve coupled thereto for draining fuel therefrom into a fuel tank, the draining device comprising a port configured to be coupled to a fuel vapor accessory and a sealing member displaceable between a closed position in which the port is closed by the sealing member and an open position in which fuel from the fuel vapor accessory can be drained into the tank, wherein the sealing member is displaced into the open position when pressure in the tank is substantially equal to the atmospheric press The fuel vapor system can be mounted at a top portion of the fuel tank so that when attempting to refuel the tank, the fuel level therein is lower than the fuel level inside the liquid trap The draining device can be configured to allow disengagement of the sealing member from the port only when the filler head of the fuel tank is opened.

The draining device can be configured to allow disengagement of the sealing member from the port only when pressure equalization between the inside of the tank and the outside ambient occurs.

Any one or more of the following features and designs can be configured in a fuel-vapor system and a valve, according to the presently disclosed subject matter, individually or in combinations thereof:

A cover having a side wall and apertures defined in the side wall;

The port can be coupled to an inlet nozzle configured to be coupled to a fuel vapor accessory;

The bottom portion of the seal holding body and the cover thereof can be configured for snap coupling to one another;

The fuel vapor accessory can be a tube of a fuel vapor system extending between a fuel vapor valve and a fuel vapor treating device;

The fuel vapor accessory can be a liquid trap configured to separate fuel liquid from fuel vapor inside the tank.

According to a further aspect of the presently there is disclosed a draining device for draining fuel from a fuel vapor system into a fuel tank, said draining device comprising a port configured to be coupled to a fuel vapor accessory and a sealing member displaceable between a closed position in which said port is closed by said sealing member and an open position in which fuel from said fuel vapor accessory can be drained into the tank, wherein said sealing member is displaced into said open position when pressure in the tank is substantially equal to the pressure at the fuel vapor accessory and the fuel level in the tank is below the fuel level in said fuel vapor accessory such that said sealing member is displaced to said open position by fluid forces exerted by said fuel from the fuel vapor accessory on the sealing member.

The draining device can further include an inlet nozzle configured to be coupled to the fuel vapor accessory and being in fluid communication with the port.

The port can be defined in a seal holding body configured for holding the sealing member.

The seal holding body can include a bottom portion having a diameter larger than the diameter of the port.

The seal holding body can include a cover having a plurality of apertures and configured to retain the sealing member inside seal holding body. The apertures can be defined a side wall of the cover. The apertures can be defined on a circumference of the cover and the side wall can be larger than the thickness of the sealing member.

The cover can include a diameter larger than that of the sealing member and wherein the apertures are formed about the periphery of the cover, such that even when the sealing member can be urged onto the inner surface of the cover, the apertures remain. The bottom portion and the cover can be configured for snap coupling with one another.

The sealing member can be a sealing disk having a diameter larger than the diameter of the port, and defining an inlet face for engaging the port and an outlet face directed towards ambient of the draining device. The bottom portion can include a side wall having a flange configured to allow snap coupling of the cover. The flange can be formed with apertures facilitating fluid flow from the seal holding member.

The inlet nozzle can include an insertion end configured to be introduced into an aperture formed in the fuel vapor accessory. The aperture can include a diameter smaller than that of the insertion end. The insertion end can be configured to engage a circumferential wall portion of the aperture such that the circumferential wall portion can be slightly bent inwardly, thereby forming a ring-shaped fold. The ring-shaped fold can be formed such that it bears against the insertion end providing thereby sealing engagements therewith.

The insertion end can be configured to extend inside the fuel vapor accessory and to protrude from an inner wall thereof.

The insertion end can include a bore providing fluid communication between fuel vapor accessory and the inlet nozzle. The insertion end can include a cutaway configured to allow fluid gravitating on a wall portion of the fuel vapor accessory about the insertion end to enter the bore. The cutaway can be configured such that fluid communication can be allowed between the bore and the surrounding of the insertion end, even when the liquid level in the fuel vapor accessory can be lower than the height of the protrusion of the insertion end therein. The cutaway can be configured to allow draining of liquid from the fuel vapor accessory even when the pressure level therein can be not higher than the pressure level inside the inlet nozzle. The cutaway provides a path for fluid into the bore.

The insertion end further can include a tapered portion defined at a remote end thereof, the tapered portion being configured with a varying outer diameter increasingly changing towards the inlet nozzle. The remote end can include a diameter smaller than that of the aperture facilitating thereby the insertion of the insertion end through the aperture.

The insertion end can include a shoulder portion configured with a diameter larger than that of the insertion end. The shoulder portion serves as a stop member preventing displacement of the insertion end out of the aperture. The insertion end can further comprise an engagement portion configured to provide sealing engagement with a circumferential wall portion of the aperture. The cutaway can be in the form of a slit formed along the length of the insertion.

According to a further aspect of the presently disclosed subject matter there is provided a fuel vapor system having a draining arrangement comprising:

a pipe segment having an aperture defined by circumferential wall portion;

a draining device for draining fuel from a fuel vapor accessory into a fuel tank including:
    an inlet nozzle having an insertion end configured to be introduced into the aperture and to engage the circumferential wall portion such that the circumferential wall portion can be slightly bent inwardly, thereby sealingly engaging the insertion end, the insertion end can include a bore providing fluid communication between the pipe segment and the inlet nozzle, and a cutaway configured to allow fluid from the pipe segment to enter the bore; and
    a port being in fluid communication with the bore and a sealing member displaceable between a closed position in which the port can be closed by the sealing member and an open position in which fuel from the fuel vapor accessory can be drained into the tank;

wherein the sealing member can be displaced into the open position when pressure in the tank can be substantially equal to the pressure at the fuel vapor accessory and the fuel level in the tank can be below the fuel level in the fuel vapor accessory such that the sealing member can be displaced to the open position by fluid forces exerted by the fuel from the fuel vapor accessory on the sealing member.

The fuel vapor accessory can be a tubing extending between a fuel vapor valve and a canister. Alternatively The fuel vapor accessory can be a liquid trap configured for separating fuel liquid from fuel vapor inside the fuel vapor system.

The draining device can be upwardly disposed with respect to the tank such that drainage therethrough can be carried out as a siphon.

The area of the port can be smaller than the area of a face of the sealing member on which pressure from the tank can be applied.

The sealing member can be configured such that pressure required to hold the sealing member in the closed position thereof can be smaller than the pressure required to pressure required to displace the sealing member to the open position thereof.

According to a further aspect of the presently disclosed subject matter there is provided a fuel tank comprising a draining device as described above.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
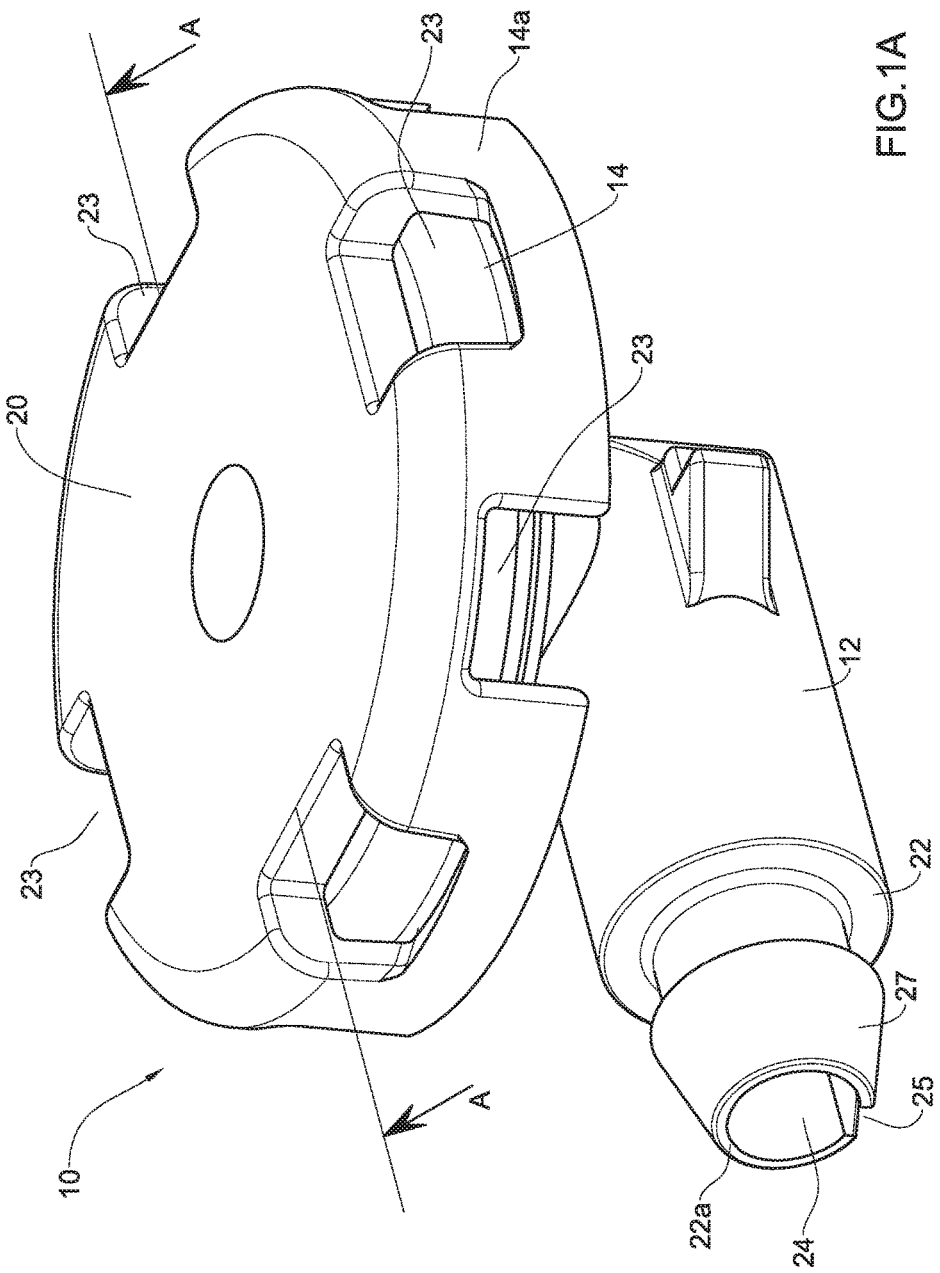
FIG. 1A is perspective view of a draining valve in accordance with an example of the presently disclosed subject matter.
Figure 1B:
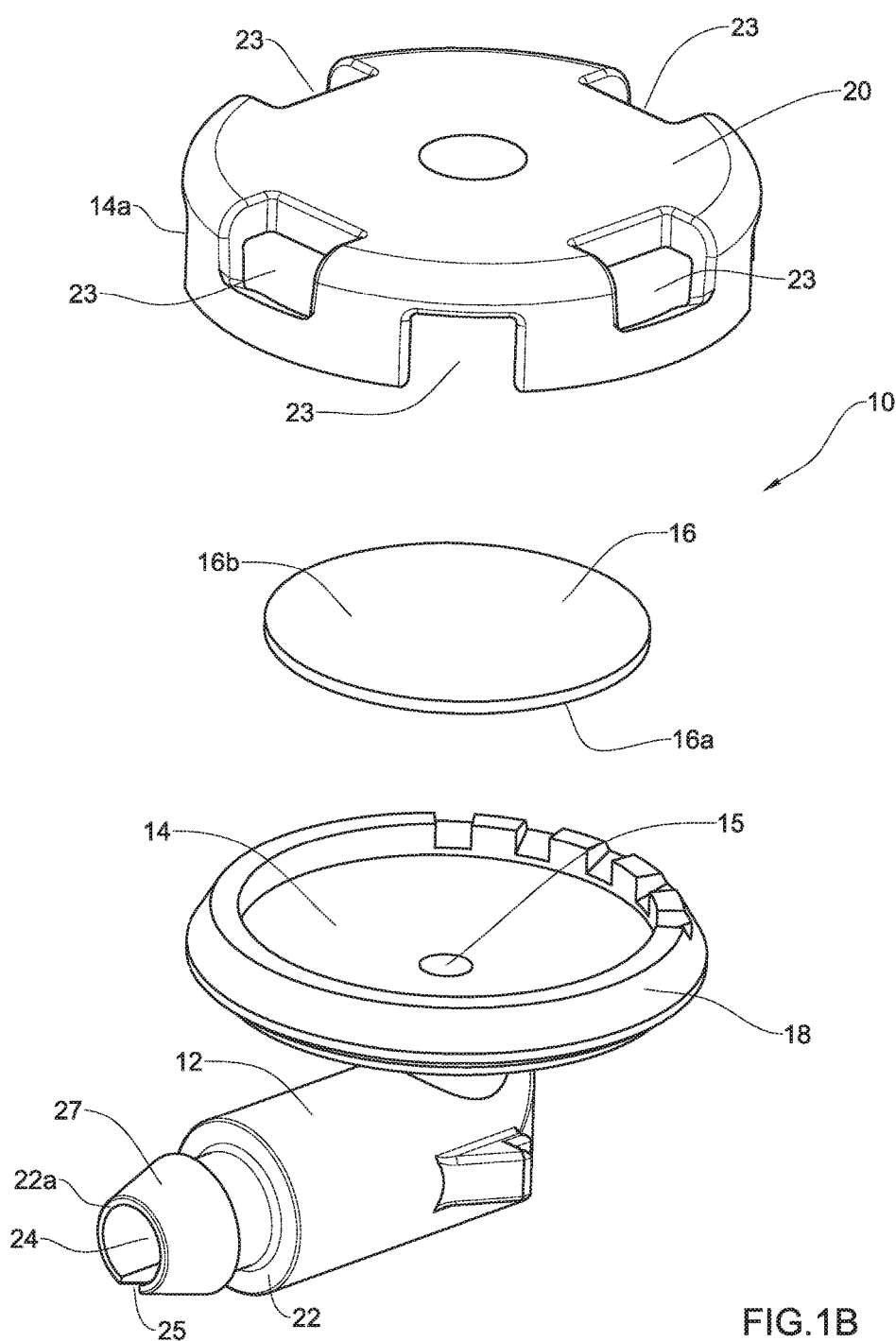
FIG. 1B is an exploded view of the draining valve of FIG. 1A.
Figure 1C:
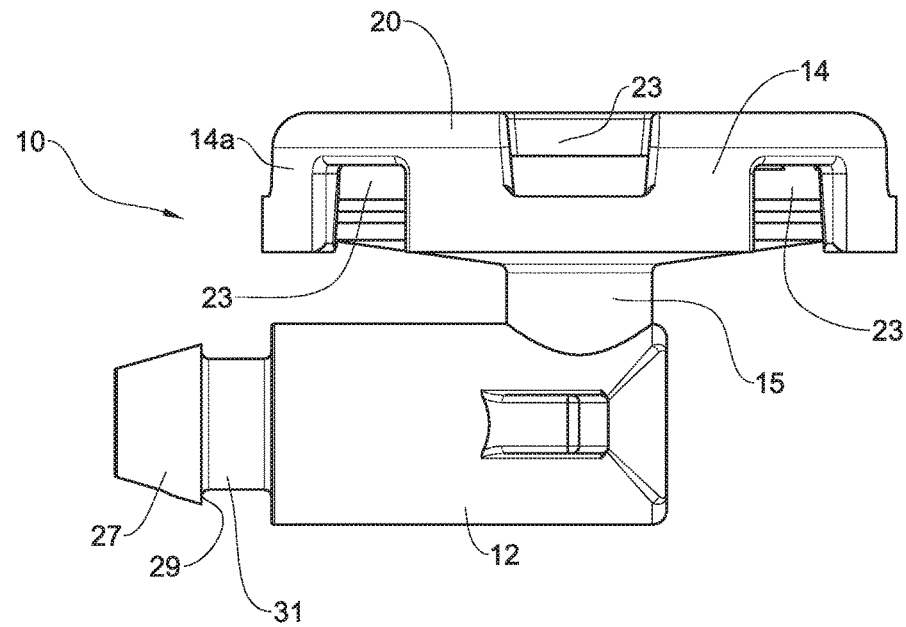
FIG. 1C is a side view of the draining valve of FIG. 1A.
Figure 1D:
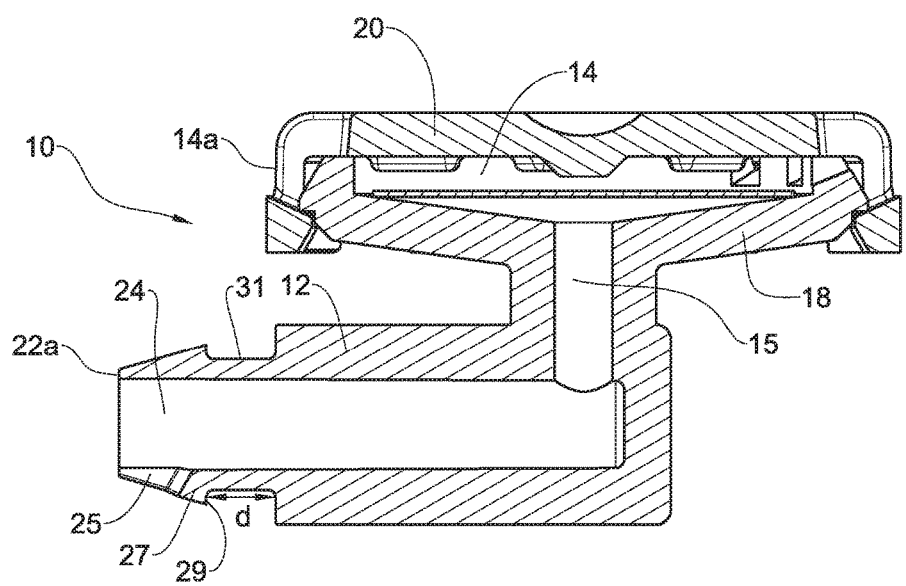
FIG. 1D is side sectional view of the draining valve of FIG. 1A, taken along lines A-A.

FIGS. 1A through 1D show a draining valve 10 in accordance with an example of the presently disclosed subject matter. The draining valve 10 includes an inlet nozzle 12 configured to be coupled to a fuel vapor accessory, such as a liquid trap or a tube extending towards a vapor treating device (not shown). The inlet nozzle 12 is terminated at one end thereof in a port 15 coupled to a seal holding body 14. The seal holding body 14 includes a sealing member 16 held therein and configured to seal the port 15 when in the closed position, and to allow fluid flow through the port when in the open position.

According to the illustrated example the seal holding body 14 includes a bottom portion 18 having a diameter larger than the diameter of the port 15, and a cover 20 having a plurality of apertures 23 here illustrated as defined on a side wall 14a of the cover 20. The bottom portion 18 and the cover 20 can be configured for snap coupling to one another.

The sealing member 16, according to this example is a sealing disk, made from a sealing material such as rubber, silicone and the like, having a diameter larger than that of the port 15. The sealing member 16 defines an inlet face 16a for engaging the port 15 and an outlet face 16b directed towards ambient of the valve, for example the volume of a fuel tank.

In the closed position, the sealing member 16 is disposed over the port 15 thereby precluding fluids from the tank to enter the port 15 and the inlet nozzle 12. In the open position however, the sealing member 16 is configured to move away from the port 15 thereby allowing fluid from the nozzle 12 to exit the draining device 10 through the port and the apertures 23. The sealing member 16 is retained inside the body 14 by the cover 20, while the fuel from the inlet nozzle 12 is drained through the apertures 23 in the cover.

It is appreciated that the apertures 23 in the cover 20 can be formed such that they are not covered by the sealing member 16 when the latter is disengaged from the port 15. For example, the body 14 may have a side wall 14a defined about the circumference thereof and being larger than the thickness of the sealing member 16. The apertures according to this example are defined on the side wall 14a, such that when the sealing member 16 is displaced to the open position thereof whereby the sealing member 16 engages the inner surface of the cover 20, fuel from the nozzle 12 can exit the body 14 through the apertures one the side wall.

According to a further example the bottom portion 18 of the seal holding member 14 includes a side wall includes a flange 18a configured to allow snap coupling of the cover 20. The flange 18a can be formed with apertures 19 facilitating fluid flow from the seal holding member. It is appreciated that the apertures 19 can be defined on one side of the flange facilitating fluid flow only from that side towards the tank. This way, the draining valve 10 can be disposed inside the tank such that the apertures are downwardly directed allowing thereby the fuel to gravitate towards to the tank.

According to another example, the cover 20 can have a diameter larger than that of the sealing member 16 and the apertures 23 can be formed about the periphery of the cover, such that even when the sealing member is urged onto the inner surface of the cover, the apertures remain uncovered allowing fuel from the nozzle to pass through the body 14 and exit therefrom through the apertures 23.

According to an example of the presently disclosed subject matter the sealing member 16 includes a diameter larger than the diameter of the port 15. This way, as explained in detail hereinafter the pressure required to prevent the displacement of the sealing member 16 to its open position is minimal According to the illustrated example the inlet nozzle 12 includes an insertion end 22 configured to be introduced into an aperture formed in the fuel vapor accessory.

Figure 2A:
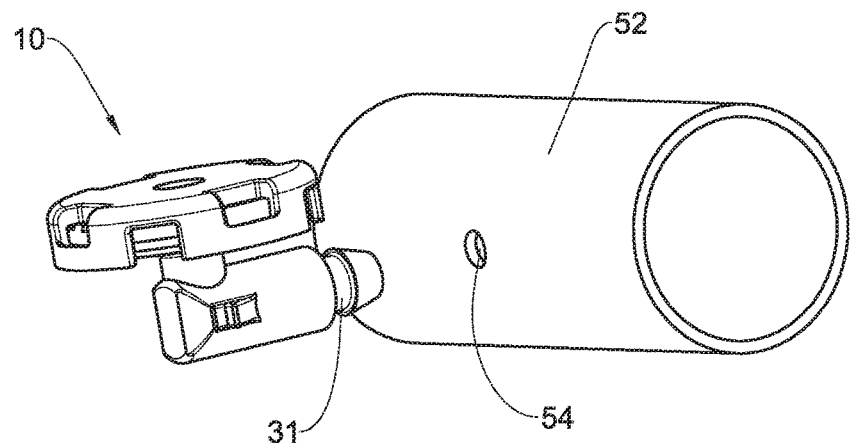
FIG. 2A is a perspective view of the draining arrangement having the draining valve of FIG. 1A.
Figure 2B:
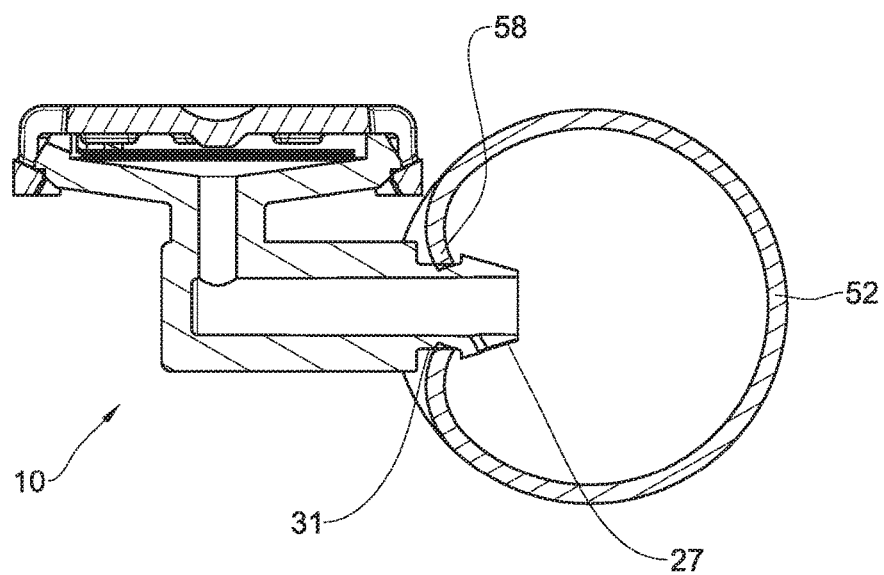
FIG. 2B is a side sectional view of the draining arrangement of FIG. 2A in an assembled position.

FIG. 2A is a perspective view of a draining arrangement 50 including the draining valve 10 of FIGS. 1A-1D and a pipe segment 52 having an aperture 54 defined by circumferential wall portion 56. The pipe segment can be a portion of a fuel vapor accessory or can be coupled to a fuel vapor accessory.

The aperture 54, which according to the illustrated example is a circular aperture, includes a diameter, which is slightly smaller than that of the insertion end 22. The pipe segment 52 is made of a flexible material, which allows for sealing engagement therewith. In addition, the insertion end 22 can be made of material, which provides sealing engagement with the circumferential wall portion 56 of the aperture 54, when it is inserted therein.

Due to the slight difference between the diameters of the aperture and the insertion end 22, the insertion end 22 is further configured to engage the circumferential wall portion such that the circumferential wall portion 56 is slightly bent inwardly, thereby forming a ring-shaped fold 58 (shown in FIG. 4A) providing thereby further sealing engagement between the aperture 54 and the insertion end 22. It is noted that the insertion end 22, when disposed inside the aperture 54, protrudes inside the pipe segment 52, such that the ring-shaped fold 58 bears against the insertion end 22, providing thereby sealing engagements therewith.

It is appreciated that the width of the ring-shaped fold 58 formed by the wall portion 56 of the aperture 54 is determined by the difference between the diameter of the aperture 54 and that of the insertion end 22. That is to say, when the insertion end 22 is disposed inside the aperture 54 the latter is forced thereby to expand by inwardly bending the wall portion 56 to form a ring-shaped fold 58. The ring-shaped fold 58 can thus have a width which is configured for providing the required sealing between the pipe segment 52 and the insertion end 22. It is further noted, that the insertion end 22, according to some examples, can be configured to extend inside the pipe segments 52 and to protrude from the inner wall thereof such that the entire width of the ring-shaped fold 58 bears on the insertion end 22. That is to say that the insertion and 22 is configured with a length in accordance with the width of the ring-shaped fold 58.

It will be appreciated that the ratio between the diameter of the aperture 54 and that of the insertion end 22, can be determined in accordance with the sealing requirements. For example, in case the draining arrangement is utilized in a fuel vapor system, where materials are subjected to swelling and expansions, the ratio can be determined such that the expansion of the insertion end 22 and the expansion of the aperture 54 do not result in a leak. According to an example, the material of the pipe segment 52 has similar characteristics as that of insertion end 22, such that the effect of the fuel thereon is substantially similar The insertion end 22 further includes a bore 24 providing fluid communication between the pipe segment 52 and the inlet nozzle 12, and a cutaway 25 configured to allow fluid gravitating on the wall portion of the pipe segment to enter the bore 24. In other words, since the insertion end 22 protrudes from the inner wall of the pipe segment 52, liquid droplets accumulating thereabout cannot be drained into the inlet nozzle 12, until the liquid level exceeds the height of the protrusion of the insertion end 22. Thus, in order to allow any liquid entrainment in the pip segment 52 to be drained into the inlet nozzle 12, the cutaway 25 is configured such that fluid communication is allowed between the bore 24 and the surrounding of the insertion end 22, even when the liquid level in the pip segment is lower than the height of the protrusion of the insertion end 22 inside the pipe segment 52.

It is appreciated that accordingly the cutaway 25 allows draining of liquid from the pipe segment 52 even when the pressure level therein is not higher than the pressure level inside the inlet nozzle 12. That it to say, fluid inside the pipe segment 52 is not urged to drain into the inlet nozzle 12 by the mere pressure inside the pipe segment 52, rather the fluid therein gravitates to the lowest point thereof. Accordingly, the pipe segment 52 can be disposed above the draining valve 10 and the inlet nozzle 12, allowing thereby the fluid therein to gravitate into the inlet nozzle 12. Thus, the cutaway 25 formed in the insertion end 22 provides a path for the fluid into the bore 24 of the inlet nozzle 12.

According to the particular example shown in FIGS. 1A through 2B, the insertion end 22 further includes a tapered portion 27 defined at the remote end 22a thereof, and configured with a varying outer diameter increasingly changing towards the inlet nozzle 12. The diameter at the remote end 22a, is smaller or the same as the diameter of the aperture 54 facilitating thereby the insertion of the insertion end 22 through the aperture 54, while the diameter increases towards the inlet nozzle 12. Accordingly, as the insertion end 22 is further pushed through the aperture 54, the increasing diameter of the tapered portion 27 urges the circumferential wall portion 56 of the aperture 54 inwardly forming thereby the ring-shaped fold 58.

In the present example, the insertion end 22 further includes a shoulder portion 29 configured with a diameter larger than that of the insertion end 22, such that once the insertion end 22 is disposed inside the aperture 54 and the ring-shaped fold 58 engages the insertion end 22, the shoulder portion 29 abuts the edge of the ring-shaped fold 58. The shoulder portion 29 thus, serves as a stop member preventing displacement of the insertion end 22 out of the aperture 54.

According to the illustrated example, the shoulder portion 29 is defined by the proximal end of the tapered portion 27 which includes a diameter larger than that of the insertion end 22. Accordingly, the insertion end 22 includes a tapered portion 27 having a remote end 22a configured with a diameter smaller or substantially the same as that of the aperture 54. The diameter increasingly changed towards the shoulder portion 29 where it is larger than the diameter of the aperture 54 and substantially the same as or larger than the diameter of the ring-shaped fold 58. The insertion end 22 further defines an engagement portion 31 defined between the shoulder portion 29 and tapered portion 27, and configured to provides sealing engagement with the ring-shaped fold 58.

The cutaway 25 according to the present example is formed as a slit formed along the length of the tapered portion 27, extending between the remote end 22a and the shoulder portion 29.

It is appreciated that the length of the engagement portion 31 (denoted in FIG. 1D as d) is configured in accordance with the width of the ring-shaped fold 58, such that the ring-shaped fold 58 on one hand sealingly engages the engagement portion 31 and on the other hand abuts against the shoulder portion 29. This way, the insertion end 22 is securely held in place and provides a durable sealing engagement. It is appreciated that the shoulder portion 29 can be configured to provide further sealing engagement with the ring-shaped fold 58.

Figure 3:
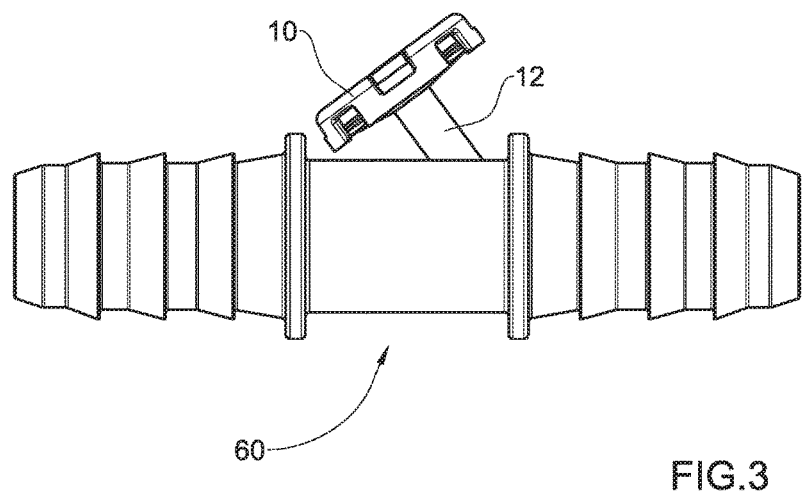
FIG. 3 is a perspective view of the draining valve of FIG. 1A coupled to a tube of a fuel vapor system.

Reference is now made to FIG. 3, the draining valve 10 can be mounted on a fuel vapor tubing 60 of a fuel vapor system (not shown), for example a tubing which extends between fuel vapor valves and a canister. According to the illustrated example the fuel vapor tubing 60 is mounted inside a fuel tank (not shown), such that the draining valve 10 allows drainage of the fuel inside the tubing into the tank, and precludes the fuel from reaching the canister.

According to the illustrated, example the draining valve 10 is upwardly disposed such that drainage therethrough is carried out as a siphon, as explained hereinafter. When the fuel vapor system in the tank operates fuel liquid is accumulated therein and the tubing can get clogged with liquid. The inlet nozzle 12 of the draining valve 10 is filled with fuel and gravitational forces of the fuel are applied over the inside face 16a of the sealing member 16. When the vehicle, in which the tank is mounted, is operating pressure inside the fuel tank is higher than the pressure outside the tank, thus the pressure applied over the outside face 16a of the sealing member 16, maintains the sealing member engaged with the port 15. This way, the valve 10 is in the closed position thereof, and fuel vapor from the tank does not enter the fuel vapor system through the draining valve 10. In this position, fuel vapor from the tank can only enter the fuel vapor system through a designated fuel accessory, for example through a liquid trap.

As known a siphon works when gravitational potential energy difference between liquid in an upper reservoir and lower reservoir leaves reduced pressure at the top of the siphon proportional to the height differences.

Accordingly, when the pressure inside the tank is reduced and is substantially equal to the atmospheric pressure, there are no sufficient forces to overcome the gravitational potential energy between the liquids inside the inlet nozzle 12 and the liquid inside the tank. As a result the sealing member is urged away from theport. Thus, at this point the sealing member 16 is displaced away from the port 15 into the open position of the draining valve 10, and the liquids from the tubing are drained to the fuel tank through the port 15 and the apertures 23 defined in the cover 20.

As mentioned hereinabove, since the sealing member 16 includes a diameter larger than the diameter of the port 15 the pressure required to prevent the displacement of the sealing member 16 to its open position is minimal. That is to say, the pressure gradient over the sealing member 16 between the ambient of the valve (for example the fuel tank in which the valve is mounted) and the inside of the port 15 is defined as the ratio of force to the area over which that force is distributed namely:

$$\Delta P = \frac{F_o}{A}$$

where is $F_o$ is the force applied on the outlet face 16a of the sealing member 16, and A is the area of the outlet face 16a over which the force is applied. Thus, since the sealing member 16 is urged to its opened position by the weight of the fuel inside the port 16, the nozzle 12 and the tubing 60, the pressure inside the tank applied over the outlet face 16a serves as a counterforce preventing the movement of the sealing member. Thus, $\Delta P$, which designates the difference between the pressure on the inlet face 16a and the pressure at the outlet face 16b, defines the amount of pressure gradient force which is required for overcoming the gravity forces exerted by the liquids inside the port.

It is thus appreciated that since the area of the port 15 is smaller than the area of the outlet face 16b of the sealing member 16, the pressure from the tank is applied on a larger area of the sealing member, than the area on which the pressure applied on the inlet face 16a. Accordingly, the amount of pressure required to overcome the forces of the liquid is minimal.

According to one example, the draining device 10 is mounted to the tubing 30 such that the sealing member 16 is disposed upwards or diagonally upwards. This way, gravitational forces of the sealing member 16 facilitate in maintaining it engaged with the port 15. When the pressure in the tank is reduced however, symphonic drainage is facilitated and the liquid from the tubing exert forces to lift the sealing member 16 thereby allowing the liquids to be discharged through the port 15 and down into the fuel tank.

It is appreciated that according to some examples of the presently disclosed subject matter when the liquid level in the tank is higher than the liquid level inside the tubing 30, the sealing member 16 is maintained in engagement with the port 15 even when the pressure in the tank is substantially equal to the atmospheric pressure. This is due to the fact that the fuel in the tank exert forces on the outside face 16b of the sealing member 16 equal or higher than the forces exerted on the inside face 16a thereof by fuel in the tubing 30. Thus, in order to allow drainage of fuel form the tubing 60, the draining device 10 can be disposed at a high point inside the tank, such that only when the fuel level in the tank is near the maximum capacity thereof, the draining device will not open.

It should be noted that when drainage of liquid in the fuel vapor system is precluded, fuel inside the fuel vapor system may prevent refueling of the tank. Thus, the height of the draining device in the tank can be determined in accordance with the desirable maximum refueling level of the tank.

It is appreciated that the vapor tubing 60 can be a segment of a fuel accessory tube delivering fuel vapor towards a fuel vapor treating device, such as a canister. Any accumulating fuel liquid can be drained through the draining arrangement towards the fuel tank. Accordingly, since the pressure level in the fuel tank is likely to be higher than that in the fuel vapor system, i.e. the pipe segment, the pressure exerts forces on the insertion end 22 urging it further into the aperture (not shown). Thus, when insertion end 22 is further urged inside the aperture, the length of the engagement portion residing inside the pipe segment increases providing thereby more sealing engagement area for engaging the ring-shaped fold (not shown). When the pressure level inside the tank is equal to or lower than that in the vapor tubing 60, draining of the fuel from the pipe segment is allowed.

It is further appreciated that the vapor tubing 60 can be made of material providing the required durability capable to maintain its characteristics in fuel conditions. At least the circumferential wall portion, is configured with flexibility allowing forming thereby the ring-shaped fold, and having sealing properties as required given the fuel tank conditions.

Figure 4:
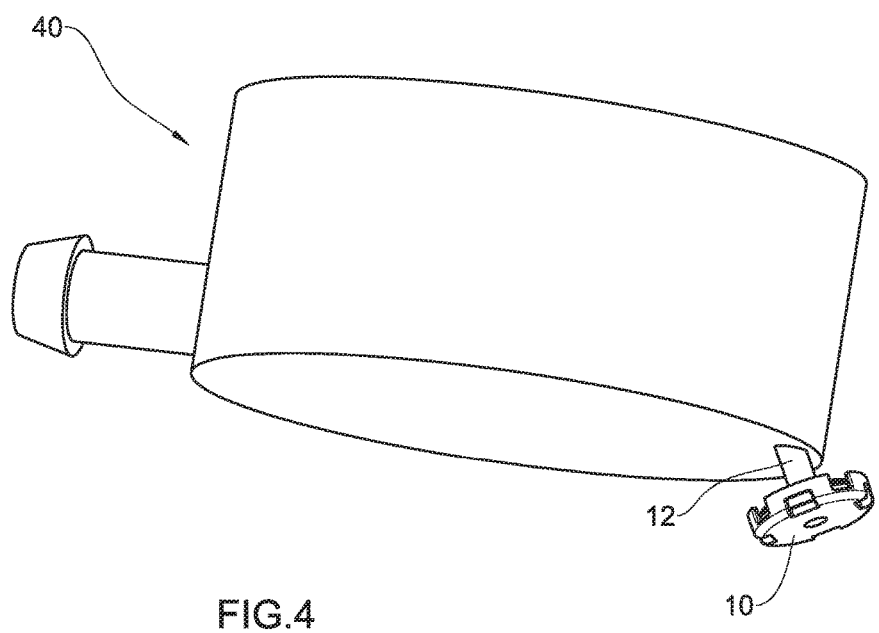
FIG. 4 is a perspective view of the draining valve of FIG. 1A coupled to a fuel liquid trap.

FIG. 4 shows a draining device 10 mounted on a liquid trap 70, configured for separating fuel liquid from fuel vapor inside the tank. The fuel vapor enters the liquid trap 40 through the inlet 42, fuel liquids are accumulated inside the trap, and then can be drained back into the tank (not shown) through the draining device 10. Similar to the operation described hereinabove with regards to the tubing 60 of FIG. 3, the liquid trap 40 can be drained by the draining device 10 when the pressure in the tank is substantially equal to the atmospheric pressure, and when the liquid level in the tank is below the liquid level in the liquid trap.

During the course of normal operation of the vehicle pressure at the fuel tank exerts forces on the sealing member of the draining valve 10, thereby urging the sealing member on the port of the draining valve. In this position fuel vapor cannot enter the liquid trap 40 through the port of the draining device, and liquid accumulated inside the liquid trap cannot be drained into the tank. However, when the filler head of the fuel tank is opened for example for refueling thereof, pressure equalization between the inside of the tank and the outside ambient occurs. As the pressure in the tank is reduced to the atmospheric pressure level, the forces exerted by the liquid inside the liquid trap 40 urge the sealing member 16 away from the port 15 of the draining device 10 thereby allowing the liquid to be drained to the tank. At this stage the low pressure in the tank does not apply sufficient forces on the sealing member 16 to prevent the displacement thereof.

It is appreciated that in order to facilitate refueling of the tank, the liquid trap can be mounted at a top portion of the fuel tank so that when attempting to refuel the tank, the fuel level therein is lower than the fuel level inside the liquid trap.

It is further appreciated that when the fuel level in the tank reaches the draining device, the fuel urges the sealing member to engage the port, thus preventing fuel from entering the fuel vapor system through the draining device. Thus, in case the vehicle is rolled over or inclined such that fuel reaches the draining device, the sealing member is urged by the fuel to the closed position thereof.

It is appreciated that the draining device according to the presently disclosed subject matter allows disposing thereof at the highest point in the tank hence, allowing the draining device to operate until the fuel level in the tank is nearly at its maximum level. This is due to the fact that draining device can operate as siphon and thus can be disposed upwardly, and that the draining device requires minimal space.

It is further appreciated that the draining device according to the presently disclosed subject matter is configured for passive drainage of fuel from the fuel vapor system.

Those skilled in the art to which the presently disclosed subject matter pertains will readily appreciate that numerous changes, variations, and modifications can be made without departing from the scope of the invention, mutatis mutandis.

The invention claimed is:

1. A draining device for draining fuel from a fuel vapor system into a fuel tank, said draining device comprising:
   a seal holding body having an upper inner surface, an inlet port and an outlet port;
   said inlet port configured to be coupled to a fuel vapor accessory;
   said outlet port configured for being in fluid communication with the fuel tank; and
   a sealing member displaceable between a closed position in which said inlet port is closed by said sealing member and an open position in which sealing member engages said upper inner surface while concurrently enabling fuel from said fuel vapor accessory to exit said seal holding body and enter into the fuel tank via the outlet port;
   the sealing member being disposed between the inlet port and the outlet port;
   wherein said sealing member is displaced into said open position when pressure in the tank is substantially equal to a pressure at the fuel vapor accessory and a fuel level in the tank is below a fuel level in said fuel vapor accessory such that said sealing member is displaced to said open position by fluid forces exerted by said fuel from said fuel vapor accessory on said sealing member;
   wherein, in operation of the draining device, gravitational forces of the sealing member facilitate in maintaining the sealing member engaged with said inlet port in the closed position.

2. The draining device according to claim 1, wherein said sealing member defines an inlet face for engaging said inlet port, and an outlet face directed towards the internal volume of the fuel tank.

3. The draining device according to claim 1, wherein in the open position the sealing member is configured to move away from the inlet port thereby allowing fluid to exit the draining device through the inlet port and the outlet port.

4. The draining device according to claim 1, further comprising an inlet nozzle configured to be coupled to the fuel vapor accessory and being in fluid communication with said inlet port.

5. The draining device according to claim 4 wherein said inlet nozzle includes an insertion end configured to be introduced into an aperture formed in the fuel vapor accessory.

6. The draining device according to claim 5, further comprising at least one of the following:
   wherein said aperture includes an aperture diameter that is smaller than a respective diameter of said insertion end;
   wherein said insertion end is configured to engage a circumferential wall portion of said aperture such that the circumferential wall portion is slightly bent inwardly, thereby forming a ring-shaped fold;
   wherein said insertion end is configured to engage a circumferential wall portion of said aperture such that the circumferential wall portion is slightly bent inwardly, thereby forming a ring-shaped fold, and, wherein said ring-shaped fold is formed such that it bears against said insertion end providing thereby sealing engagements therewith;
   wherein said insertion end is configured to extend inside said fuel vapor accessory and to protrude from an inner wall thereof;
   wherein said insertion end includes a bore providing fluid communication between fuel vapor accessory and said inlet nozzle;
   wherein said insertion end includes a bore providing fluid communication between fuel vapor accessory and said inlet nozzle, and wherein said insertion end includes a cutaway configured to allow fluid gravitating on a wall portion of said fuel vapor accessory about said insertion end to enter said bore;
   wherein said insertion end includes a bore providing fluid communication between fuel vapor accessory and said inlet nozzle, and wherein said insertion end includes a cutaway configured to allow fluid gravitating on a wall portion of said fuel vapor accessory about said insertion end to enter said bore, and, wherein said cutaway is configured such that fluid communication is allowed between said bore and the surrounding of the insertion end, even when the liquid level in said fuel vapor accessory is lower than the height of the protrusion of the insertion end therein;
   wherein said insertion end includes a bore providing fluid communication between fuel vapor accessory and said inlet nozzle, and wherein said insertion end includes a cutaway configured to allow fluid gravitating on a wall portion of said fuel vapor accessory about said insertion end to enter said bore, and, wherein said cutaway is configured such that fluid communication is allowed between said bore and the surrounding of the insertion end, even when the liquid level in said fuel vapor accessory is lower than the height of the protrusion of the insertion end therein, and (a) wherein said cutaway is configured to allow draining of liquid from said fuel vapor accessory even when the pressure level therein is not higher than the pressure level inside said inlet nozzle, or (b) wherein said cutaway provides a path for fluid into said bore;
   wherein said insertion end further includes a tapered portion defined at a remote end thereof, said tapered portion being configured with a varying outer diameter increasingly changing towards said inlet nozzle;
   wherein said insertion end further includes a tapered portion defined at a remote end thereof, said tapered portion being configured with a varying outer diameter increasingly changing towards said inlet nozzle, and, wherein said remote end includes a diameter smaller than that of said aperture facilitating thereby the insertion of said insertion end through said aperture;
   wherein said insertion end includes a shoulder portion configured with a diameter larger than that of the insertion end;
   wherein said insertion end includes a shoulder portion configured with a diameter larger than that of the insertion end, and, wherein said shoulder portion serves as a stop member preventing displacement of said insertion end out of said aperture; or wherein said insertion end includes a shoulder portion configured with a diameter larger than that of the insertion end, and, wherein said shoulder portion serves as a stop member preventing displacement of said insertion end out of said aperture, and, said insertion end further comprises an engagement portion configured to provide sealing engagement with a circumferential wall portion of said aperture.

7. The draining device according to claim 6, wherein:
said insertion end includes a cutaway configured to allow fluid gravitating on a wall portion of said fuel vapor accessory about said insertion end to enter said bore;
said cutaway is configured such that fluid communication is allowed between said bore and the surrounding of the insertion end, even when a liquid level in said fuel vapor accessory is lower than the height of the protrusion of the insertion end therein; and
said cutaway is in the form of a slit formed along the length of said insertion.

8. The draining device according to claim 1 wherein said seal holding body is configured for holding said sealing member.

9. The draining device according to claim 8 wherein said seal holding body includes a bottom portion having a diameter larger than a respective diameter of the inlet port.

10. The draining device according to claim 9 wherein said seal holding body includes a cover having said outlet port in the form of a plurality of apertures and configured to retain said sealing member inside said seal holding body.

11. The draining device according to claim 10 wherein said plurality of apertures are defined in a side wall of said cover.

12. The draining device according to claim 11 wherein said plurality of apertures are defined on a circumference of said cover and said side wall is larger than a thickness of the sealing member.

13. The draining device according to claim 10 wherein said cover includes a diameter larger than that of said sealing member, and wherein said plurality of apertures are formed about a periphery of said cover, such that even when the sealing member is urged onto an inner surface of the cover, the plurality of apertures remain.

14. The draining device according to claim 10 wherein said bottom portion and said cover are configured for snap coupling with one another.

15. The draining device according to claim 10 wherein said sealing member includes a sealing disk having a diameter larger than the diameter of the inlet port, and defining an inlet face for engaging the inlet port and an outlet face directed towards ambient of the draining device.

16. The draining device according to claim 10 wherein said bottom portion includes a side wall having a flange configured to allow snap coupling of said cover.

17. The draining device according to claim 16 wherein said flange is formed with apertures facilitating fluid flow from the seal holding body.

18. A fuel tank comprising a draining device according to claim 1.

19. A fuel vapor system having a draining arrangement, the draining arrangement comprising:
a pipe segment having an aperture defined by circumferential wall portion;
a draining device for draining fuel from a fuel vapor accessory into a fuel tank, the draining device including:
an inlet nozzle having an insertion end configured to be introduced into said aperture and to engage said circumferential wall portion such that said circumferential wall portion is slightly bent inwardly, thereby sealingly engaging said insertion end, said insertion end includes a bore providing fluid communication between said pipe segment and said inlet nozzle, and a cutaway configured to allow fluid from the pipe segment to enter said bore; and
an inlet port being in fluid communication with said bore;
an outlet port configured for being in fluid communication with the fuel tank; and
a sealing member displaceable between a closed position in which said inlet port is closed by said sealing member and an open position in which fuel from said fuel vapor accessory can be drained into the fuel tank via the outlet port;
the sealing member being disposed between the inlet port and the outlet port;
wherein said sealing member is displaced into said open position when pressure in the fuel tank is substantially equal to a pressure at the fuel vapor accessory and a fuel level in the fuel tank is below a fuel level in said fuel vapor accessory such that said sealing member is displaced to said open position by fluid forces exerted by said fuel from said fuel vapor accessory on said sealing member;
wherein, in operation of the draining device, gravitational forces of the sealing member facilitate in maintaining the sealing member engaged with said inlet port in the closed position.

20. The fuel vapor system according to claim 19 wherein said fuel vapor accessory includes a tubing extending between a fuel vapor valve and a canister.

21. The fuel vapor system according to claim 19 wherein said fuel vapor accessory includes a liquid trap configured for separating fuel liquid from fuel vapor inside said fuel vapor system.

22. The fuel vapor system according to claim 19 wherein said draining device is upwardly disposed with respect to said tank such that drainage therethrough is carried out as a siphon.

23. The fuel vapor system according to claim 19 wherein an area of said inlet port is smaller than a respective area of a face of said sealing member on which pressure from said tank is applied.

24. The fuel vapor system according to claim 23 wherein said sealing member is configured such that pressure required to hold said sealing member in the closed position thereof is smaller than the pressure required to displace said sealing member to the open position thereof.

25. A draining device for draining fuel from a fuel vapor system into a fuel tank, said draining device comprising:
an inlet port configured to be coupled to a fuel vapor accessory;
an outlet port configured for being in fluid communication with the fuel tank; and
a sealing member displaceable between a closed position in which said inlet port is closed by said sealing member and an open position in which fuel from said fuel vapor accessory can be drained into the fuel tank via the outlet port;
the sealing member being disposed between the inlet port and the outlet port;
wherein said sealing member is displaced into said open position when pressure in the tank is substantially equal to a pressure at the fuel vapor accessory and a fuel level in the tank is below a fuel level in said fuel vapor accessory such that said sealing member is displaced to said open position by fluid forces exerted by said fuel from said fuel vapor accessory on said sealing member;

wherein, in operation of the draining device, gravitational forces of the sealing member facilitate in maintaining the sealing member engaged with said inlet port in the closed position; and wherein said sealing member is in the form of a sealing disk.

\* \* \* \* \*